UNITED STATES PATENT OFFICE.

GEORGE H. CHARLS, OF CANTON, OHIO.

RUST-RESISTING ALLOY OF IRON.

15,208. Specification of Reissued Letters Patent. Reissued Oct. 18, 1921.

No Drawing. Original No. 1,363,564, dated December 28, 1920, Serial No. 392,912, filed June 30, 1920. Application for reissue filed March 21, 1921. Serial No. 454,228.

*To all whom it may concern:*

Be it known that I, GEORGE H. CHARLS, a citizen of the United States, and a resident of Canton, Stark county, State of Ohio, have invented an Improvement in Rust-Resisting Alloys of Iron, of which the following is a specification.

This invention relates to alloys of iron adapted to resist tendencies to rust and corrosion. One of the objects thereof is to provide a practical alloy of the above type which will possess rust-resisting properties to a marked degree. Another object is to provide an alloy of the above type which can be simply and inexpensively made. Other objects will be in part obvious and in part pointed out hereinafter.

The invention accordingly consists in certain features of the alloy herein illustratively described, and the scope of the application of which will be indicated in the following claims.

In my alloy, I use as a chief constitutent, iron; and it may be noted that the term "iron" is used in a broad sense to comprehend the inclusion of a carbon, thus making what might more specifically be termed "steel". Incorporated with the iron, aside from the elements usually associated therewith in commercial practice, I include small quantities of both copper and molybdenum.

The carbon is preferably kept low, and by low carbon, I mean that the content shall be not over .20%. The copper in the resultant alloy is to be preferably kept under .20% and I prefer to keep it somewhat lower. The molybdenum in this alloy produces beneficial results even when a considerable amount is used; but I preferably confine it to a small amount. In fact, better results are obtained with less molybdenum and I have secured excellent results with this element present in the proportion of about .10%. While I have attained the best results with the above proportions, still it is to be understood that larger proportions of both copper and molybdenum may be used and a substantial rust-resisting effect in the resultant alloy be attained.

The copper and molybdenum may be added to the molten iron or steel preferably in liquid form and in such manner that they will be uniformly distributed throughout the metal.

An alloy of the above nature has been found not only to possess the properties which are the dominant aim of this invention but to be readily workable and to be especially adapted for manufacture into sheets.

As variation might be made in the alloy herein set forth without departing from the scope of this invention, it is to be understood that it is herein described as illustrative rather than in a limiting sense.

I claim as my invention:

1. A rust-resisting alloy comprising iron, and small but effective amounts of copper and molybdenum.

2. A rust-resisting alloy comprising iron free from more than .20% of carbon, an effective amount of copper less than .20%, and a small but effective amount of molybdenum.

3. A rust-resisting alloy comprising iron, carbon less than .20%, copper in an effective amount but less than .20%, and molybdenum in an effective amount but less than .20%.

4. A rust-resisting alloy comprising iron free from more than .20% of carbon and having copper of an effective amount but less than .20% and molybdenum of an amount less than .15%.

5. A rust-resisting alloy comprising iron free from more than .20% of carbon and having copper of an effective amount but less than .15% and molybdenum of an amount less than .15%.

6. A rust-resisting alloy comprising iron free from carbon in an amount greater than .10% and having copper to an effective amount but less than .20% and molybdenum to an effective amount but less than .10%.

7. A rust-resisting alloy comprising iron free from more than .20% of carbon and having effective amounts of both copper and molybdenum.

8. A rust-resisting alloy comprising iron, carbon in an amount less than .20%, and copper and molybdenum in such amounts as will give to the resultant alloy a substantial rust-resisting effect.

Signed at Canton, this 17th day of March, 1921.

GEORGE H. CHARLS.